A. F. CUSHMAN.
Lathe-Centers.

No. 147,106. Patented Feb. 3, 1874.

WITNESSES:
W. W. Dodge.
W. B. Chaffee

INVENTOR:
A. F. Cushman
by Dodge & Son
Attys.

UNITED STATES PATENT OFFICE.

AUSTIN F. CUSHMAN, OF HARTFORD, CONNECTICUT.

IMPROVEMENT IN LATHE-CENTERS.

Specification forming part of Letters Patent No. 147,106, dated February 3, 1874; application filed October 7, 1873.

*To all whom it may concern:*

Be it known that I, AUSTIN F. CUSHMAN, of Hartford, in the county of Hartford and State of Connecticut, have invented certain Improvements in Lathe-Centers for Chucks, of which the following is a specification:

My invention consists of a center for holding lathe-chucks, the same being provided with a nut arranged to crowd the chuck off the center, and also to loosen the center from its seat in the arbor, as hereinafter explained.

Figure 1:
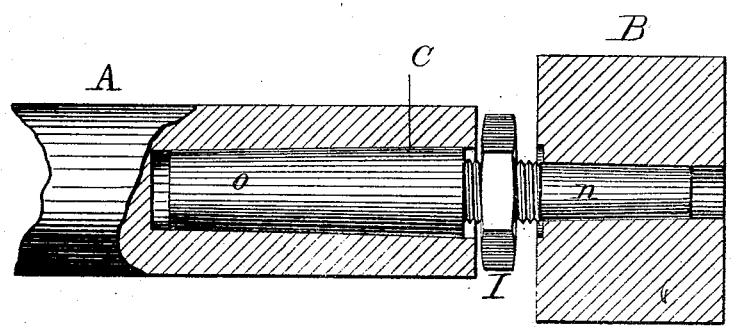
Figure 2:
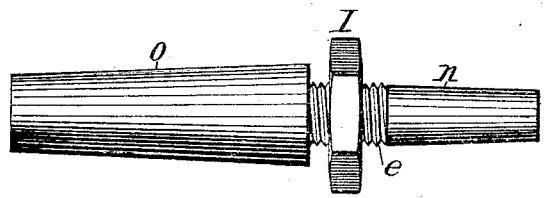

Figure 1 is a side view, showing the center as arranged for use in a lathe, portions of the arbor and the chuck being shown in section. Fig. 2 represents the center detached.

In using chucks on lathes, it has generally been customary to screw the chuck on the end of the arbor or mandrel; but with the smaller chucks now so generally used for holding drills and other small articles, they are frequently made with a taper stem to fit into a corresponding socket in the end of the arbor, from which it is sometimes difficult to remove them.

The object of my invention is to provide a center, by which a chuck can be readily connected to the arbor, and from which the chuck can be easily detached, and the center as readily removed from the arbor.

My center, which is indicated by C in the drawings, consists of a short steel bolt, its body $o$ being turned of a size to fit into the socket in the end of the arbor A, as represented in Fig. 1, its opposite end $n$ being made less in diameter, and tapered to enable the chuck B to be crowded and held thereon, as represented. Between the two taper portions $n$ and $o$ it is made cylindrical, or of uniform diameter, for a short distance, and on this portion a screw-thread is cut, as shown in Figs. 1 and 2, and a nut, I, is fitted thereon, as represented.

To use the center, it is inserted in the arbor, as shown in Fig. 1, with the screw portion extending a short distance within the socket, and the chuck is then secured upon its opposite end $n$. To remove the chuck, the nut I is screwed up against it, thus starting or crowding it off the taper stem $n$, a very slight movement being sufficient to release the chuck, after which the nut is screwed in the opposite direction, and as it comes in contact with the end of the arbor A it draws the center out, thus loosening it from its seat, when it can be at once removed.

It is obvious that the part $n$ may be made as large as, or even larger in diameter than, the part $o$, that depending entirely upon the size of the chuck to be used.

In manufacturing them for sale with my chucks, I fit the part $n$ to the chuck, and leave the body $o$ cylindrical, so that the party using it may taper it to fit the particular lathe on which it is to be used.

Having thus described my invention, what I claim is—

The center C, provided with the nut I, arranged to loosen the chuck from the center, and also to loosen the center from the arbor, as herein set forth.

AUSTIN F. CUSHMAN.

Witnesses:
 CHARLES H. HAWLEY,
 E. L. CUSHMAN.